(12) United States Patent
Johnson et al.

(10) Patent No.: US 9,696,169 B2
(45) Date of Patent: Jul. 4, 2017

(54) METHOD OF DETECTING THE OPENING OF CLOSED ROADS

(75) Inventors: Richard A. Johnson, Rochester Hills, MI (US); Steven C. Tengler, Grosse Pointe Park, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 2065 days.

(21) Appl. No.: 12/727,379

(22) Filed: Mar. 19, 2010

(65) Prior Publication Data

US 2011/0231087 A1    Sep. 22, 2011

(51) Int. Cl.
*G01C 21/34* (2006.01)

(52) U.S. Cl.
CPC ................ *G01C 21/3461* (2013.01)

(58) Field of Classification Search
CPC .................................................. G01C 21/3461
USPC ................. 701/201, 411, 416, 420, 421, 210
See application file for complete search history.

(56) References Cited

U.S. PATENT DOCUMENTS

| 6,405,130 | B1* | 6/2002 | Piwowarski | 701/411 |
| 7,035,734 | B2* | 4/2006 | Shaffer et al. | 701/414 |
| 8,175,793 | B2* | 5/2012 | Stanton | 701/429 |
| 2010/0153004 | A1* | 6/2010 | Natsume | 701/201 |

* cited by examiner

*Primary Examiner* — Basil T Jos
(74) *Attorney, Agent, or Firm* — Leydig, Voit & Mayer, Ltd.

(57) ABSTRACT

The described principles provide a method and system for identifying a potentially closed road based on reroute requests, and of accommodating the potential road closure while continuing to test the road status periodically via routing decisions and rerouting requests. While the optimal route assumes that the potentially closed road is open, a replacement route is defined assuming that the potentially closed road is closed. A fraction of users are sent along the optimal route, and if a reroute request is received, the potentially closed road is assumed to be closed still. The affected user is rerouted to a recovery route that matches the optimal route up to the potentially closed road, and then differs from the optimal route thereafter to avoid the potentially closed road.

20 Claims, 6 Drawing Sheets

METHOD OF DETECTING THE OPENING OF CLOSED ROADS

BACKGROUND OF THE INVENTION

In-vehicle telematics systems provide an increasingly broad spectrum of services to users, such as entertainment, emergency notification, and so on. However, one of the most popular services provided by such systems is still navigational assistance. In this role, the telematics unit receives or generates a route starting point and a route ending point, and then generates a series of directions for taking the user from the starting point to the ending point. Since the user is most often in a road vehicle, the directions often take the form of directions to take certain roads for certain distances or until certain turning points. These are sometimes referred to as turn-by-turn directions.

For such directions to be optimally effective, however, it is important for the telematics device to have an awareness of current roads and their availability. For example, when a new roadway has been added to the road system, this may provide a better route for a given trip, and should be available for routing in that case. Similarly, when a road has been removed or moved, this information is also important in providing correct and efficient navigational assistance to a user.

While road moving/removal and road addition changes have been traditionally accounted for by way of map update packages, one class of road changes remains difficult to account for. In particular, temporary road closures are of too immediate an effect and too short a duration to be included in map update packages. Moreover, real-time road closure information is rarely publicly and widely disseminated. At the same time, an unknown temporary road closure can have a significant negative impact on a user's navigation experience.

Moreover, when a road is known to have been closed, the subsequent reopening of that road may allow more efficient routing of telematics users. However, as with road closure information, road reopening information is also not routinely widely available for consideration by telematics units in calculating turn-by-turn directions. Thus, a system and method are needed for enabling a vehicle telematics device to become aware of temporary road closures and subsequent reopenings.

BRIEF SUMMARY OF THE INVENTION

The invention provides a system and apparatus for enabling a vehicle telematics device to detect and account for temporary road closures and reopenings. The invention operates to the benefit of users who would use the road if it were known to have been reopened. The described process operates without direct observation of the road condition, since road condition information is difficult to obtain by direct means, i.e., checking schedules of road crews or events, engaging in physical observation of the road itself, soliciting informal reports of road conditions by users, etc.

In an aspect, the described principles allow the system and method to automatically detect when a closed road has reopened while minimizing inconvenience to the population of route guidance users that would use that road if it were open. An analysis of the characteristics of alternate routes and the route with the closed road is used in one implementation of the invention to minimize the inconvenience to potential users of that road.

In one implementation, an optimal route between the geographic origination location and the geographic destination location is identified, along with a replacement route and a recovery route. While the optimal route assumes that the potentially closed road is open, the replacement route assumes that the potentially closed road is closed. The recovery route matches the optimal route between the geographic origination location and the potentially closed road, and then differs from the optimal route thereafter to avoid the potentially closed road. This implementation tests the status of the potentially closed road by sending a predetermined fraction of users along the optimal route, and sending users other than the predetermined fraction on the replacement route. If a reroute request is received from a user on the optimal route, the potentially closed road is assumed to be closed still, and the user is rerouted to the recovery route.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system for automatically detecting and remedying a road closure through turn-by-turn routing requests and reroute requests. The system also allows the detection of a road reopening when a closed road has reopened while minimizing inconvenience to the population of route guidance users that would use that road if it were open. An analysis of the characteristics of alternate routes and the route with the closed road allows the system to minimize the inconvenience to potential users of that road while still allowing timely detection of road closure and opening status.

Figure 1:
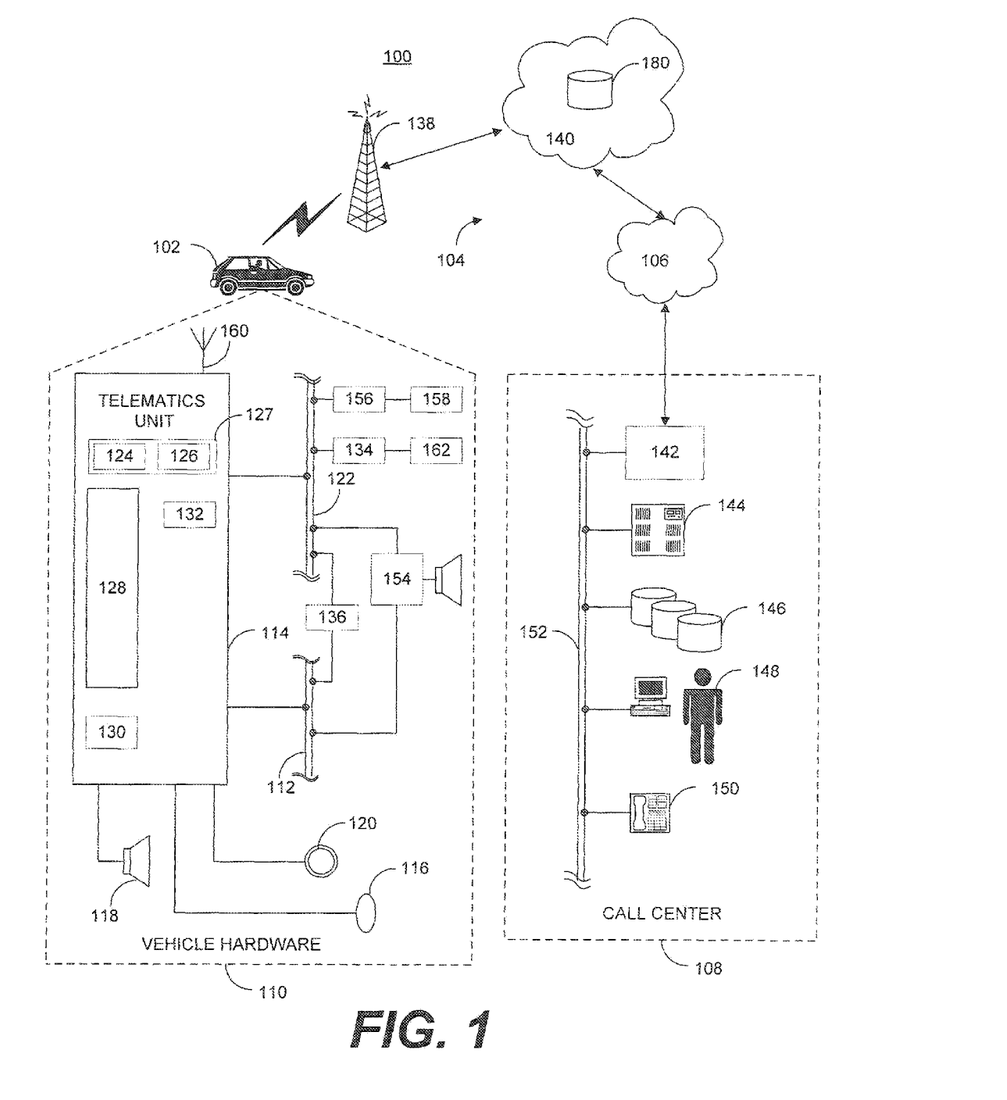
FIG. 1 is a schematic diagram of an operating environment for a mobile vehicle communication system within which the described principles may be implemented.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modern 126 may be called the network access device (NAD) 127 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
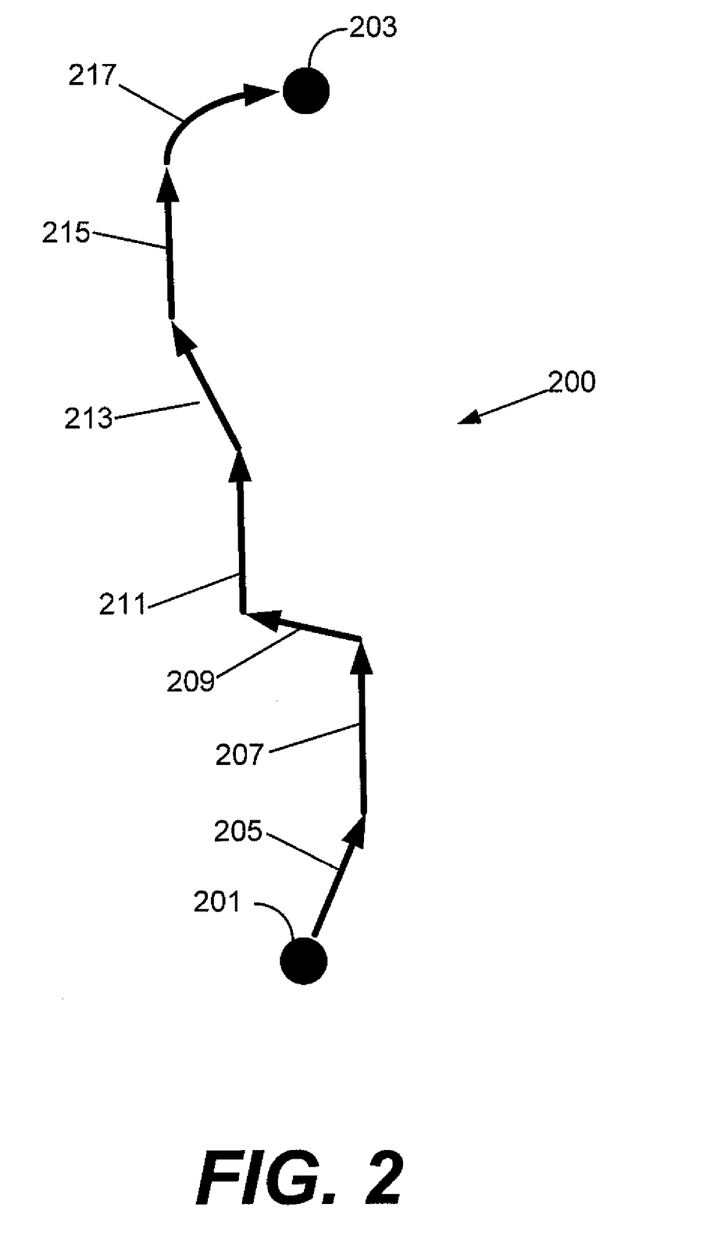
FIG. 2 is a schematic illustration of an example turn-by-turn route.

Turning to the details of an exemplary system operating within the described environment, FIG. 2 is a schematic illustration of a simple example turn-by-turn navigation route 200 to travel from an origination point 201 to a destination point 203. The route 200 is made up of travel segments 205-217. Each segment 205-217 represents a section of road way, also referred to herein as a road. Thus, references to road closure are referring to closure of section of the roadway in a way that that section cannot be traveled in at least the direction that the user would need to travel to complete the route 200.

Figure 3:
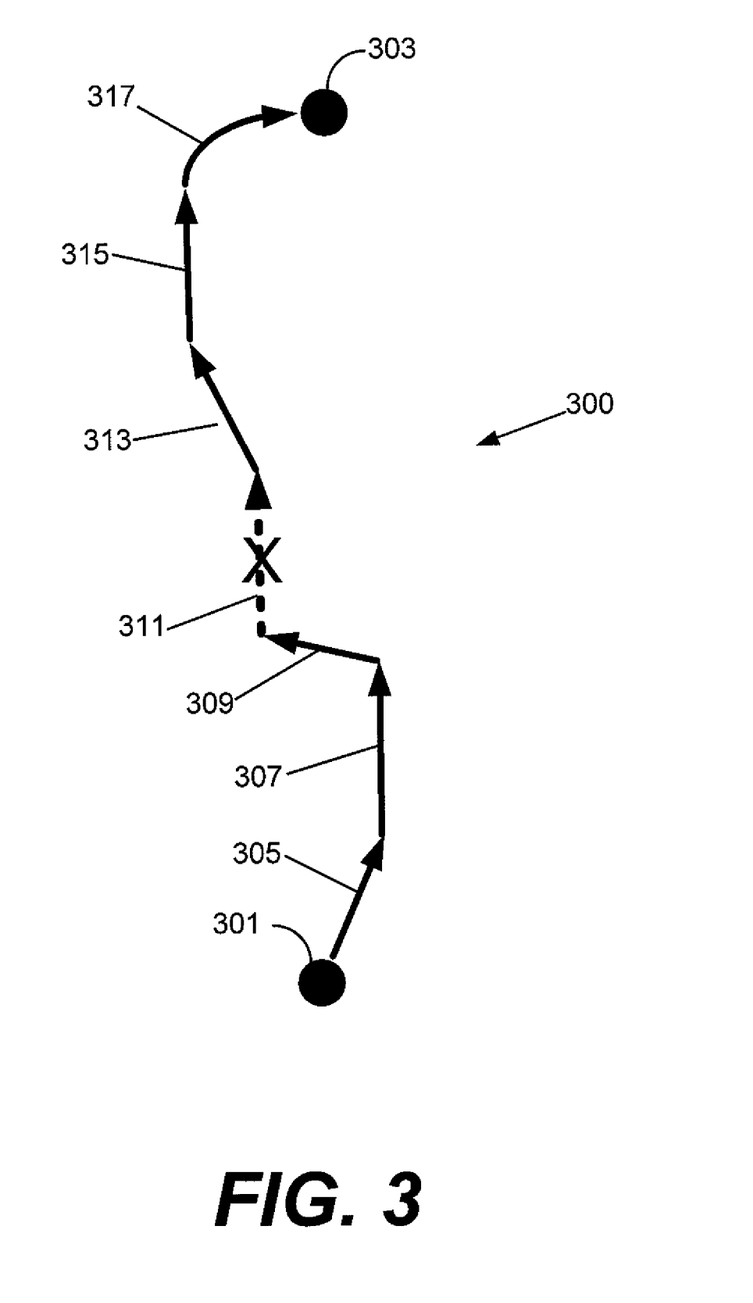
FIG. 3 is a schematic illustration of an example turn-by-turn route showing a road closure within the route, with respect to which the present rerouting system may be applied.

FIG. 3 shows the turn-by-turn navigation route 300, which is the same as route 200, but with a certain road 311 (211) closed. Thus, the user cannot complete the illustrated route 300 because they cannot travel on or past road 311 (211). In this case, the guidance provided by the route 300 (200) is inaccurate and is not useful to the user of the system.

Depending upon where a user is when the road closure condition is discovered, the system may provide either a recovery route or a replacement route. The recovery route is used when the user has traversed the original route for a substantial portion, e.g., up to the point of closure, and then requests a new route from that intermediate point to the destination. The replacement route is an alternative route between the origination point and the destination point, and is used if the road closure condition is known before routing instructions are calculated for the user.

Figure 4:
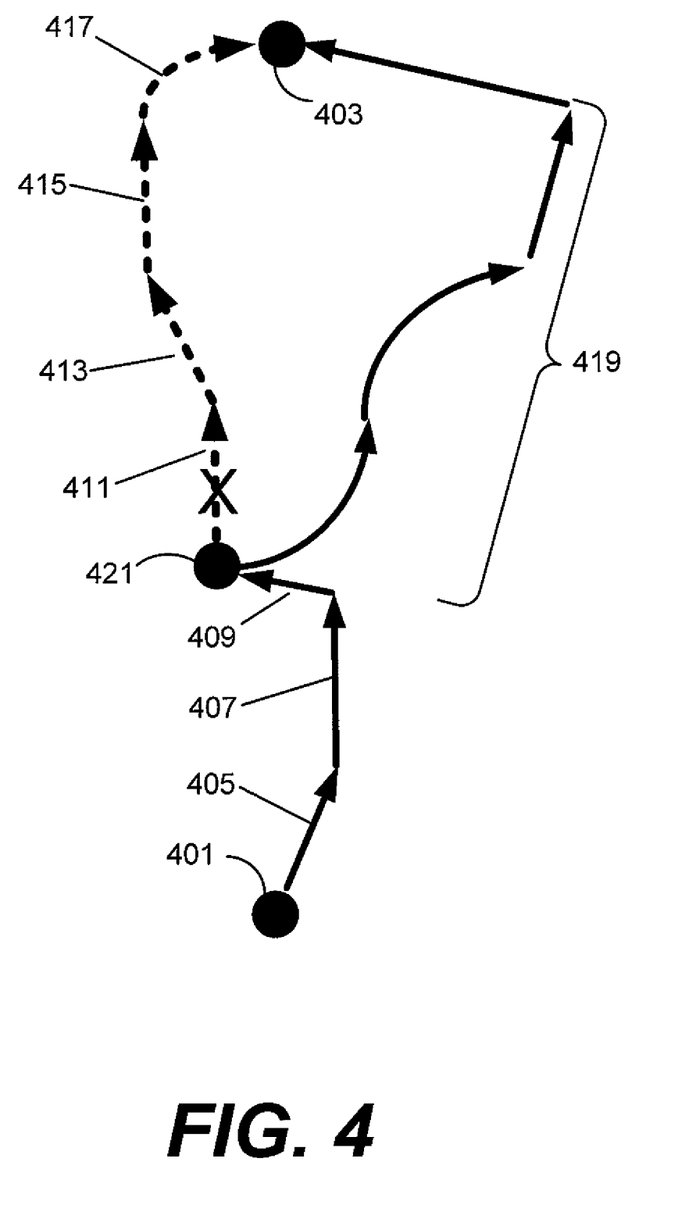
FIG. 4 is a schematic illustration of an example turn-by-turn route showing a road closure within the route and a recovery route.

Referring now to FIG. 4, the original route 300 (200) is still shown visible, but a recovery route including a recovery portion 419 is also shown. The recovery portion 419 extends from the point 421 where the original route is blocked by the road closure, and extends by way of several segments to the destination point 403. In the illustrated example, the recovery route, including the portion of the original route prior to the point 421 and the recovery portion 419 after the point 421, is less preferred due to length of travel. Indeed, the recovery route will generally be less preferable than the original route based on travel time and/or speed. However, in some cases, the recovery route will be no less preferred than the original route. As noted above, the recovery route is utilized when the user has traversed the original route for a substantial portion and then requests a new route from some intermediate point, prior to the closed road, to the destination.

As also noted, when the road closure condition is known before routing instructions are calculated for the user, the user can be given a replacement route rather than a recovery route. The replacement route can be optimized from the origination point to the destination point, rather than for just part of the route as in FIG. 4.

Figure 5:
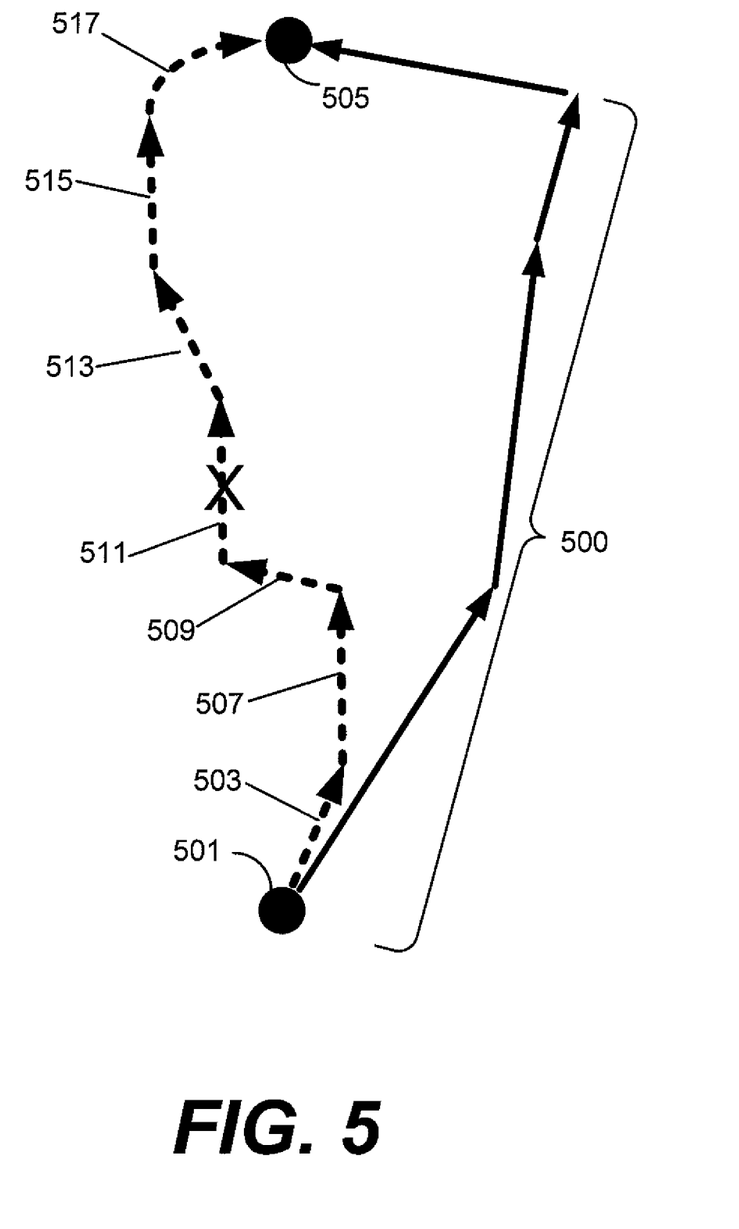
FIG. 5 is a schematic illustration of an example turn-by-turn route showing a road closure within the route and a replacement route.

In FIG. 5 the original route 300 (200) is still visible, but a replacement route 500 is also shown. The replacement route 500 extends from the origination point 501 to the destination point 505. As can be seen, the replacement route 500 entails a greater driving distance than the original route. However, it bypasses the closed road 511 and is generally also at least as preferable as, and generally more preferable than, the recovery route.

Thus, a telematics device will be able to provide more accurate and efficient directions if it can acquire information regarding the availability of known roads, i.e., where there is a temporary road closures or a subsequent reopening after such a closure, prior to generating a turn-by-turn route. In one aspect of the described principles, a call center associated with the telematics unit deduces the identity of a closed road and an approximate starting time of closure by making certain computations relative to reroute requests in the area.

In particular, when turn-by-turn directions are provided prior to knowledge of the road closure condition, the user will follow the given directions until reaching the closed road. At that point, the user will generally ask for a reroute around the closed road, causing the telematics unit, via the call center, to generate a recovery route as noted above. While isolated reroute requests are not necessarily indicative of a road problem, a cluster of such requests may be used to indicate that at least the leg of the journey immediately following the location where the reroute request is made is closed.

Figure 6:
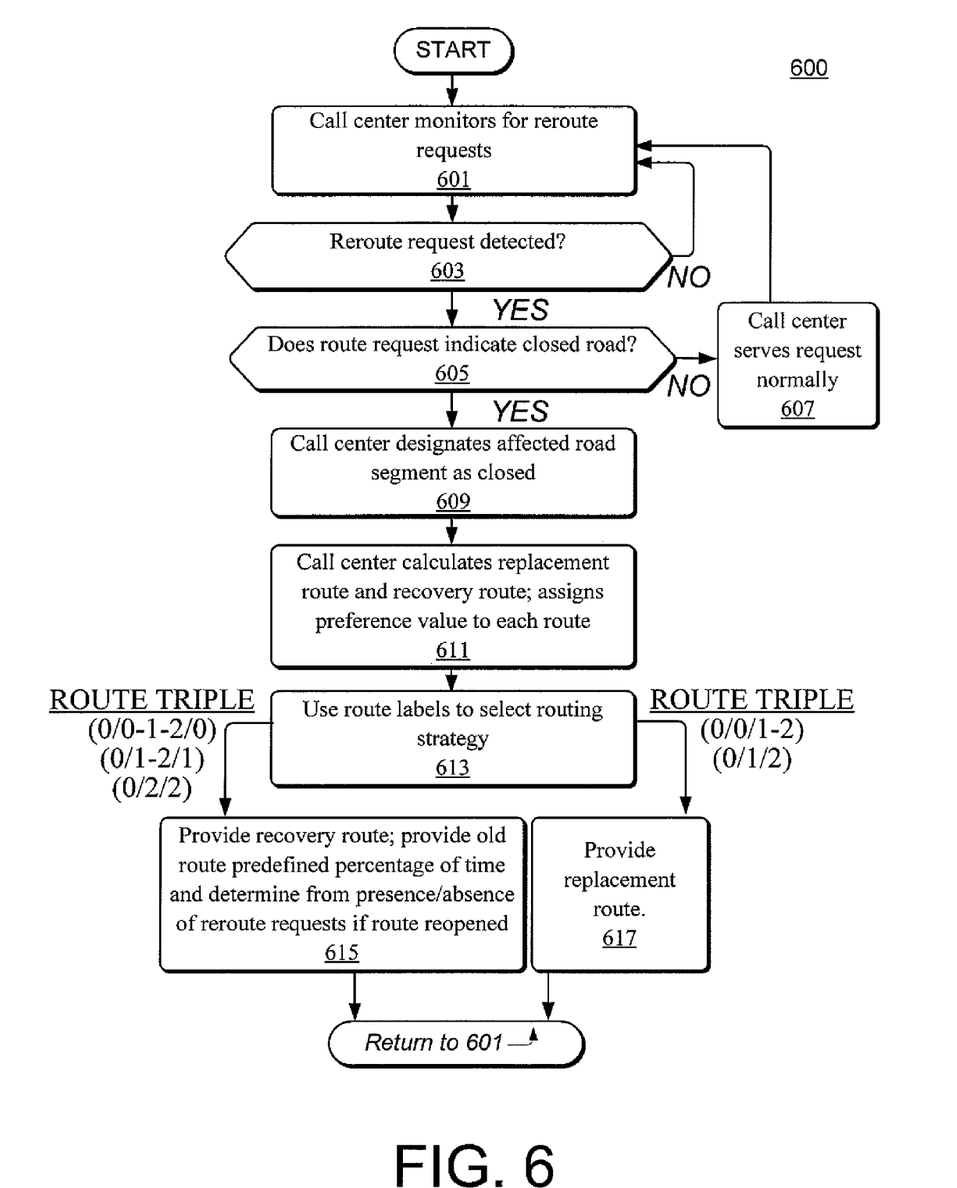
FIG. 6 is flow chart illustrating a process of detecting and remedying a road closure condition such as that illustrated by FIG. 2.

With this in mind, the details of the innovative method and system are further elucidated with reference to FIG. 6, which illustrates a flowchart of a process 600 for making route decisions in the presence of a possible road closure occurrence. The process 600 begins at stage 601, wherein the call center 108 monitors reroute requests to detect any closed roads based on such requests. If a reroute request from a closed road is not detected at stage 603, the process reverts to stage 601 and continues to monitor.

If instead a reroute request is detected at stage 603, the process 600 moves forward to stage 605, wherein the call center 108 determines whether the route request indicates a closed road. In an embodiment of the system, a reroute request is considered to indicate a closed road if it meets all of a set of predetermined criteria. For example, a reroute request may be indicative of a road closure if the request is (a) new relative to the present requester, (b) not in a tunnel, (c) on a road in the right direction, i.e. that is part of the designated route, and (d) a large percentage, i.e., 95-100% of routes with that segment generate a reroute request.

If the analysis of the reroute request against the predetermined criteria at stage 605 does not indicate a road closure, then the process flows to stage 607 to serve the request normally and returns to stage 601. If instead the analysis of the reroute request against the predetermined criteria at stage 605 indicates a road closure, then the process flows forward to stage 609, wherein the affected road segment is designated at the call center 108 as closed for the present reroute request and potentially closed with respect to future reroute requests. Note that the route will not be closed for all other requests, but may be impeded, i.e., used for only a limited number of requests, as will be discussed below.

At this point, the call center 108 will still serve the request, but will do so in a way that most efficiently accommodates the apparent road closure. Recall from above that there are three possible routes to consider for the origination point/destination point pair. The first is, of course, the old route, i.e., the route that attempted to go through the closed segment. The second route to consider is the new route or replacement route, which is another route between the origination point/destination point pair that may or may not include portion of the old route, but which represents the next best route with the closed segment blocked. The third route to consider is the recovery route, i.e., the route that is used to recover only after the driver has been routed to the closed segment. In some cases, the new route may be the same as the recovery route.

In general terms, certain facts may be deduced regarding the various routes. For example, the old route, when open, is better than the other routes. Also, the old route is apparently blocked, and there is no indication as to when it will again be available, but it may at some point reopen. The terms better, worse, longer, and shorter are used herein to indicate relative preference between routes. The preference measure may be speed, time length, complexity, or other measure. Typically the measure used is time length, taking into account any user-specific preferences such as toll avoidance etc. Other measures may include dynamic traffic loading or road impedance which characterizes the flow of traffic along a road.

Continuing with the available deductions, the new route is worse than the old route, and may indeed be much worse in some cases. The recovery route is worse than the old route—perhaps much worse—and it is also equal to or worse than the new route. For purposes of the following stages of the process 600, a convention of labeling the route quality will be as follows: A label of 0 indicates that the route in question is approximately the same length as the old route, e.g., within a predetermined tolerance such as 5%. A label of 1 is used to indicate that the route in question is longer than the old route. Finally, a label of 2 indicates that the route in question is much longer than the old route, e.g., greater by more than some predetermined tolerance such as 40% by way of example only.

Thus, at stage 611, the process 600 calculates the replacement route and a recovery route, and assigns a preference value (e.g., 0, 1, or 2) to each of the old route, replacement route, and the recovery route. Once the routes are known and labeled, the process 600 determines which route to provide based on a set of criteria at stage 613, keeping in mind that the goal in an implementation is to provide the best route on average for the most users while preserving the ability to detect road reopening. Thus, the route labels are used at stage 613 to select a routing strategy. In particular, different route label triples (Old Route Label/Replacement Route Label/Recovery Route Label) will lead to different strategies.

Thus, if at stage 613 it is determined that the labels provide a route label triple of (0/0-1-2/0), the process flows to stage 615, wherein the process 600 follows a strategy of generally providing the recovery route, while occasionally (e.g., a predetermined portion or percentage of the time) providing the old route to test it for reopening by awaiting a reroute request if any. The percentage of use for the old route in this strategy is not critical, but a percentage of about 10% allows an occasional test while avoiding excess user inconvenience. This strategy generally minimizes the inconvenience to users while still allowing some determination as to when the route is no longer blocked.

Similarly, if at stage 613 it is determined that the labels provide a route label triple of (0/1-2/1) or (0/2/2), the process flows to stage 615. In the case of a (0/1-2/1) triple, the user inconvenience of rerouting is no greater than if the new route were used from the outset. In the case of a (0/2/2) triple, the new route and recovery route are similarly alike in value. Moreover, in this case, the old route is significantly more beneficial than either of the other routes, making an occasional test worth the user inconvenience even if the route is still blocked.

If at stage 613 it is determined that the labels provide a route label triple of (0/0/1-2), the process flows to stage 617, wherein the process 600 follows a strategy of providing the replacement route. Since the replacement route and the old route are essentially equivalent, this strategy avoids inconvenience to users and does not check for the reestablished availability of the old route.

Similarly, if at stage 613 it is determined that the labels provide a route label triple of (0/1/2), the process flows to stage 617. In this particular case, this is the only triple that indicates a significant detriment to sending the user on the old route and forcing a reroute if the road is still blocked. This is because the recovery route is both worse than the old route and significantly worse than the new route.

Once a routing strategy is selected and executed based on the determined route triples, the process returns to stage 601, wherein the call center 108 continues to monitor reroute requests to detect any closed roads based on such requests.

Although the process 600 provides some indication as to when the closed road again becomes passable, there are other techniques that are additionally or optionally used to determine this information in one aspect of the described principles. For example, the process 600 may also monitor for the presence of any user vehicle on the link that is thought to be closed, and may designate the link as no longer closed when this occurs. There are number of ways that the presence of a user vehicle on the link may be monitored including checking communications between vehicles and servers, checking for emergency button activation, noting TBT downloads including reroutes, and observing any airbag deployment calls.

It will be appreciated that the disclosed system and method provide a road closure detection and remediation mechanism, and also allow for timely notice of road reopening, in a way that works especially well with respect to closures that impact large numbers of users and closures with the largest consequences. The process is also scalable and easily implemented via automation, allowing human operators to specifically focus on closures that impact large number of users, have large consequences, and/or have existed for an extended period of time.

It will also be appreciated, however, that the foregoing methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing turn-by-turn navigation instructions comprising:
   receiving, at a call center, a request from a user of a vehicle navigation device to receive navigational instructions to enable travel from a geographic origination location to a geographic destination location;
   calculating, at a server, a first set of turn-by-turn navigation instructions defining a first route between the geographic origination location and the geographic destination location and determining that a particular road on the first route has been identified at the call center as potentially closed;
   calculating a second set of turn-by-turn navigation instructions defining a second route between the geographic origination location and the geographic destination location assuming the particular road is closed;
   calculating a third set of turn-by-turn navigation instructions defining a third route between the geographic origination location and the geographic destination location, wherein the third route includes the portion of the first route extending from the geographic origination location to the particular road, and wherein the remainder of the third route differs from the first route and avoids the particular road; and
   calculating a preference value for each of the first, second and third routes, and selecting only a single one of the first, second, and third routes based on the preference value magnitudes and on a frequency indicator that specifies the use of a particular route for a particular fraction of requests, and providing the turn-by-turn navigation instructions of the selected route to the user of the vehicle navigation device.

2. The method of providing turn-by-turn navigation instructions according to claim 1, wherein labeling each of the first, second and third routes according to preference value comprises labeling each of the first, second and third routes with a number related to user desirability of the route.

3. The method of providing turn-by-turn navigation instructions according to claim 2, wherein each number related to user desirability of the route is based on a calculated time to complete the route, with shorter times being indicative of higher user desirability.

4. The method of providing turn-by-turn navigation instructions according to claim 2, wherein labeling the first route with a number related to user desirability of the route comprises calculating the label for the first route without regard to the status of the particular road as potentially closed.

5. The method of providing turn-by-turn navigation instructions according to claim 1, wherein the frequency indicator specifies the use of the first route for a particular fraction of requests, and wherein the method further comprises, subsequent to providing the turn by-turn navigation instructions of the selected route to the user, monitoring for a reroute request from the user.

6. The method of providing turn-by-turn navigation instructions according to claim 5, further comprising removing the identity of the particular road as potentially closed if a reroute request is not received from the user.

7. The method of providing turn-by-turn navigation instructions according to claim 1, further comprising removing the identity of the particular road as potentially closed if a communication is received at the call center from a vehicle traveling on the particular road.

8. The method of providing turn-by-turn navigation instructions according to claim 7, wherein receiving a communication at the call center from a vehicle traveling on the particular road comprises detecting at least one of an emergency button activation, a turn-by-turn navigation download, and an airbag deployment.

9. A method of selecting turn-by-turn navigation instructions for provision to a user of a vehicle telematics unit comprising:
   receiving, at a call center request from the vehicle telematics unit to receive navigational instructions to enable travel from a geographic origination location to a geographic destination location;
   calculating, at a server, a first set of turn-by-turn navigation instructions defining an optimal route between the geographic origination location and the geographic destination location, the optimal route having a first length, wherein a road on the first route has been identified at the call center as being a potentially closed road, and wherein the first set of turn-by turn navigation instructions assumes that the potentially closed road is open;
   calculating a second set of turn-by-turn navigation instructions defining a replacement route between the geographic origination location and the geographic destination location based on an assumption that the potentially closed road is closed, the replacement route having a second length;

calculating a third set of turn-by-turn navigation instructions defining a recovery route between the geographic origination location and the geographic destination location, the recovery route having a third length, wherein the recovery route includes a first portion and a second portion, wherein the first portion matches the optimal route between the geographic origination location and the potentially closed road, and wherein the second portion differs from the optimal route and avoids the potentially closed road;

selecting between a testing response and a nontesting response based on the relative values of the first, second, and third lengths and on a frequency indicator that specifies the use of a particular route for a particular fraction of requests, wherein the testing response requires providing the recovery route except for with respect to a predetermined percentage of requests, and wherein the nontesting response requires providing the replacement route.

10. The method of selecting turn-by-turn navigation instructions according to claim 9, wherein the first, second, and third lengths describe the physical extent of the respective routes.

11. The method of selecting turn-by-turn navigation instructions according to claim 9, wherein the first, second, and third lengths describe the time required to complete travel along the respective routes.

12. The method of selecting turn-by-turn navigation instructions according to claim 9, wherein the testing response is selected and the first set of turn-by-turn navigation instructions defining the optimal route are provided to the user, the method further comprising flagging the potentially closed road as being open if a reroute request is not received from the user after receiving the first set of turn-by-turn navigation instructions.

13. The method of selecting turn-by-turn navigation instructions according to claim 9, further comprising removing the identity of the potentially closed road as potentially closed if a communication is received at the call center from a vehicle traveling on the potentially closed road.

14. The method of selecting turn-by-turn navigation instructions according to claim 13, wherein receiving a communication at the call center from a vehicle traveling on the potentially closed road comprises detecting at least one of an emergency button activation, a turn-by-turn navigation download, and an airbag deployment.

15. The method of selecting turn-by-turn navigation instructions according to claim 9, wherein selecting between the testing response and the nontesting response based on the relative values of the first, second, and third lengths comprises:

selecting the testing response if (1) the first and third lengths are equal, (2) the second and third lengths are equal and greater than the first length, or (3) the first length is less than the third length, which is less than the second length; and selecting the nontesting response if (1) the first and second lengths are equal and the third length is greater than the first and second lengths, or (2) the first length is less than the second length, which is less than the third length.

16. A method of determining turn-by-turn navigation instructions for provision to a user of a vehicle telematics unit to enable travel from a geographic origination location to a geographic destination location comprising:

identifying, at a server, an optimal route between the geographic origination location and the geographic destination location, wherein a road on the optimal route is a potentially closed road, and wherein the optimal route requires the potentially closed road to be open;

identifying a replacement route between the geographic origination location and the geographic destination location, wherein the replacement route assumes that the potentially closed road is closed;

identifying a recovery route between the geographic origination location and the geographic destination location, wherein the recovery route matches the optimal route between the geographic origination location and the potentially closed road, and wherein the second portion differs from the optimal route thereafter and avoids the potentially closed road; and testing a status of the potentially closed road by sending a predetermined fraction of users, as determined by a frequency indicator that specifies the use of a particular route for a particular fraction of requests along the optimal route, and sending users other than the predetermined fraction on the replacement route.

17. The method of determining turn-by-turn navigation instructions according to claim 16, further comprising identifying the potentially closed road as open if a reroute request is not received from a user sent on the optimal route.

18. The method of determining turn-by-turn navigation instructions according to claim 16, further comprising identifying the potentially closed road as open if a communication is received at the call center from a vehicle traveling on the potentially closed road.

19. The method of determining turn-by-turn navigation instructions according to claim 18, wherein receiving a communication at the call center from a vehicle traveling on the potentially closed road comprises detecting one of an emergency button activation, a turn-by-turn navigation download, and an airbag deployment.

20. The method of determining turn-by-turn navigation instructions according to claim 16, further comprising receiving a reroute request from a user sent on the optimal route and in response to receiving the reroute request, transferring said user to the recovery route.

* * * * *